US00RE50793E

(19) United States
(12) Reissued Patent
Zimmel et al.

(10) Patent Number: US RE50,793 E
(45) Date of Reissued Patent: Feb. 10, 2026

(54) METHODS AND SYSTEMS FOR DELIVERY OF MULTIPLE PASSIVE OPTICAL NETWORK SERVICES

(71) Applicant: CommScope Technologies LLC, Hickory, NC (US)

(72) Inventors: Steven C. Zimmel, Minneapolis, MN (US); Timothy G. Badar, St. Paul, MN (US); Trevor D. Smith, Eden Prairie, MN (US)

(73) Assignee: CommScope Technologies LLC, Hickory, NC (US)

(21) Appl. No.: 17/520,042

(22) Filed: Nov. 5, 2021

Related U.S. Patent Documents

Reissue of:
(64) Patent No.: 10,469,194
Issued: Nov. 5, 2019
Appl. No.: 15/791,073
Filed: Oct. 23, 2017

U.S. Applications:
(63) Continuation of application No. 15/137,926, filed on Apr. 25, 2016, now Pat. No. 9,800,366, which is a
(Continued)

(51) Int. Cl.
*H04B 10/25* (2013.01)
*H04B 10/27* (2013.01)
*H04J 14/02* (2006.01)

(52) U.S. Cl.
CPC ..... *H04J 14/0226* (2013.01); *H04B 10/25* (2013.01); *H04B 10/27* (2013.01);
(Continued)

(58) Field of Classification Search
None
See application file for complete search history.

(56) References Cited

U.S. PATENT DOCUMENTS 5,864,413 A * 1/1999 Feldman ..... H04B 10/272 398/168
6,215,827 B1 * 4/2001 Balachandran ..... H04L 1/0003 375/262
(Continued)

FOREIGN PATENT DOCUMENTS

EP 1 657 953 A2 5/2006
KR 100990780 B1 * 1/2006
(Continued)

OTHER PUBLICATIONS

Eddenberger et al, An Introduction to PON Technologies, Mar. 2007, IEEE communications magazine pp. 517-525.*
(Continued)

*Primary Examiner* — John M Hotaling, II
(74) *Attorney, Agent, or Firm* — Merchant & Gould P.C.

(57) ABSTRACT

A system for delivering multiple passive optical network services is disclosed. The system includes a first optical transmission service comprising a common wavelength pair routed from a source to each of a plurality of subscribers. The system further includes a second optical transmission service comprising a plurality of unique wavelength pairs, where each of the unique wavelength pairs is routed from the source to a subscriber among the plurality of subscribers. The system delivers the first optical transmission service and the second optical transmission service to the subscriber on a single optical fiber.

8 Claims, 4 Drawing Sheets

Related U.S. Application Data continuation of application No. 14/054,153, filed on Oct. 15, 2013, now Pat. No. 9,325,447, which is a continuation of application No. 12/257,020, filed on Oct. 23, 2008, now Pat. No. 8,559,818.

(60) Provisional application No. 61/000,753, filed on Oct. 26, 2007.

(52) U.S. Cl.
CPC ..... *H04J 14/0232* (2013.01); *H04J 14/0246* (2013.01); *H04J 14/025* (2013.01); *H04J 14/0252* (2013.01); *H04J 14/0282* (2013.01); *H04J 14/0227* (2013.01)

(56) References Cited

U.S. PATENT DOCUMENTS 7,006,767 B1 * 2/2006 Frigo ..... H04J 14/0227 398/30
7,502,563 B2 * 3/2009 Nozue ..... H04J 14/0282 398/69
7,546,036 B2 * 6/2009 Bouda ..... H04J 14/025 398/71
7,639,946 B2 * 12/2009 Bouda ..... H04J 14/0247 398/68
7,684,705 B2 * 3/2010 Bouda ..... H04J 14/0226 398/71
7,734,178 B2 * 6/2010 Sakamoto ..... H04J 14/0226 398/67
7,738,790 B2 * 6/2010 Nozue ..... H04J 14/0282 398/69
7,773,838 B2 * 8/2010 Lee ..... H04J 14/0226 385/15
7,920,792 B2 * 4/2011 Palacharla ..... H04J 14/0282 398/71
7,978,976 B2 * 7/2011 Pohjola ..... H04J 14/0226 398/58
8,023,823 B2 * 9/2011 Bouda ..... H04Q 11/0067 398/67
8,107,816 B2 * 1/2012 Bolster ..... G02B 6/4452 398/79
8,245,116 B2 * 8/2012 Orlik ..... H03M 13/136 714/780
8,559,818 B2 10/2013 Zimmel et al.
8,565,599 B2 * 10/2013 Bouda ..... H04J 14/025 398/67
8,656,263 B2 * 2/2014 Hu ..... H03M 13/253 714/758
9,325,447 B2 4/2016 Zimmel et al.
9,454,552 B2 * 9/2016 Ma ..... G06F 17/30312
9,503,126 B2 * 11/2016 Vardy ..... H03M 13/13
9,800,366 B2 10/2017 Zimmel et al.
2002/0191250 A1 * 12/2002 Graves ..... H04Q 11/0066 398/79
2002/0196491 A1 * 12/2002 Deng ..... H04B 10/272 398/79
2004/0076426 A1 * 4/2004 Doh ..... H04J 14/0227 398/4
2004/0184806 A1 * 9/2004 Lee ..... H04H 20/42 398/79
2004/0213574 A1 * 10/2004 Han ..... H04J 14/02 398/71
2004/0234195 A1 * 11/2004 Pohjola ..... H04Q 11/0067 385/24
2005/0123300 A1 * 6/2005 Kim ..... H04J 14/025 398/84
2006/0002706 A1 * 1/2006 Lee ..... H04J 14/0226 398/71
2006/0093359 A1 * 5/2006 Lee ..... H04J 14/025 398/71
2006/0222364 A1 * 10/2006 Chung ..... H04J 14/0246 398/72
2007/0019956 A1 * 1/2007 Sorin ..... H04J 14/0282 398/71
2007/0092249 A1 * 4/2007 Akasaka ..... H04J 14/0226 398/49
2007/0092251 A1 * 4/2007 Bouda ..... H04B 10/272 398/72
2007/0092254 A1 * 4/2007 Bouda ..... H04J 14/0226 398/72
2007/0092256 A1 * 4/2007 Nozue ..... H04J 14/0282 398/72
2007/0140693 A1 * 6/2007 Li ..... H04B 10/2939 398/67
2007/0154216 A1 * 7/2007 Kim ..... H04J 14/025 398/71
2007/0183779 A1 * 8/2007 Bouda ..... H04J 14/0226 398/72
2007/0230957 A1 * 10/2007 Ozaki ..... H04J 14/0226 398/71
2008/0031625 A1 * 2/2008 Okuda ..... G02B 6/29367 398/71
2008/0089692 A1 * 4/2008 Sorin ..... H04J 14/02 398/135
2008/0131129 A1 * 6/2008 Bouda ..... G02B 6/12007 398/82
2008/0138073 A1 * 6/2008 Kim ..... H04J 14/0226 398/79
2010/0046949 A1 * 2/2010 Bainbridge ..... H04B 10/506 398/79
2010/0054740 A1 * 3/2010 Lee ..... H04J 14/0252 398/68
2010/0290782 A1 * 11/2010 Lee ..... H04Q 11/0005 370/254
2012/0128311 A1 5/2012 Bolster et al.
2012/0185755 A1 * 7/2012 Orlik ..... H03M 13/136 714/781
2012/0240006 A1 * 9/2012 Hu ..... H03M 13/253 714/756
2014/0019820 A1 * 1/2014 Vardy ..... H03M 13/13 714/752
2014/0040214 A1 * 2/2014 Ma ..... G06F 17/30312 707/693

FOREIGN PATENT DOCUMENTS

WO 00/41430 A1 7/2000
WO WO 00/41430 7/2000
WO WO 01/24432 A1 4/2001
WO WO-2006020272 A1 * 2/2006 ..... H04L 12/18
WO WO 2007/092346 A1 8/2007
WO WO 2007/092361 A1 8/2007

OTHER PUBLICATIONS

Fouli et al,OCDMA and Optical Coding: principles, application and challenges, Aug. 2007, IEEE communications magizine, pp. 27-34.*
Park et al Fiber-to-the-Home services dased on wavelenght divisioin multiplexing passive optical network, Nov. 2004 Journal of Lightwave Technology, vol. 22, No. 11 pp. 2582-2591.*
Hsueh et al, A Highly Flexible and Efficient Passive Optical Network Employing Dynamic Wavelength Allocation, Journal of Lightwave Technology, vol. 23, No. 1, Jan. 2005, pp. 277-286.*
International Search Report and Written Opinion for Application No. PCT/US2008/081118 mailed Feb. 16, 2009.
U. Hilbk et al., "High capacity WDM overlay on a passive optical network" Nov. 7, 1996, Electronic Letters vol. 32, No. 23.*
Ki-Man Choi et al., An Efficient Evolution Method From TDM-PON to Next-Generation PON, IEEE Photonic Technology, vol. 19, No. 9, May 1, 2007.*
U. Hilbk et al., "High Capacity WDM overlay on a passive optical network". Electronics Letters Nov. 7, 1996, vol. 32, No. 23, pp. 2162-2163 (Year: 1996).*
Choi, K. et al., "An Efficient Evolution Method From TDM-PON to Next-Generation PON," *IEEE Photonics Technology Letters*, vol. 19, No. 9, pp. 647-649 (May 1, 2007).

(56) References Cited

OTHER PUBLICATIONS

Hilbk, U. et al., "High capacity WDM overlay on a passive optical network," *Electronics Letters*, vol. 32, No. 23, pp. 2162-2163 (Nov. 7, 1996).

* cited by examiner

METHODS AND SYSTEMS FOR DELIVERY OF MULTIPLE PASSIVE OPTICAL NETWORK SERVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of application Ser. No. 15/137,926, filed Apr. 25, 2016, now U.S. Pat. No. 9,800,366, which is a continuation of application Ser. No. 14/054,153, filed Oct. 15, 2013, now U.S. Pat. No. 9,325,447, which is a continuation of application Ser. No. 12/257,020, filed Oct. 23, 2008, now U.S. Pat. No. 8,559,818, which application claims priority to provisional application Ser. No. 61/000,753, filed Oct. 26, 2007, which applications are incorporated herein by reference in their entirety.

TECHNICAL FIELD

The present disclosure relates generally to delivery of passive optical network services, such as from an optical service provider to a home or business. More specifically, the present disclosure relates to methods and systems for delivery of multiple passive optical network services.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and cost and may increase network reliability.

Passive optical networks may take a signal from a single incoming fiber and make it available to a number of output fibers. For example, a distribution cable may include 24 optical fibers and may run from a central office to a distribution location, such as an equipment enclosure. At the equipment enclosure, each fiber in the distribution cable may be split into a number of outgoing fibers which are made available to subscribers. For example, passive optical networks may employ 1:2, 1:4, 1:8, 1:16 and 1:32 splitting ratios for each fiber, for making optical data available to subscriber locations.

In traditional gigabit passive optical network a single transmit wavelength and a single receive wavelength are used in each 1:32 split, requiring 32 subscribers to share bandwidth on a single fiber. However, in other systems, such as DWDM systems, dedicated wavelengths are used for each subscriber. Conversion between gigabit and DWDM systems requires substantial reconfiguration of the optical network to take advantage of the dedicated wavelength system. In certain instances, replacing wires leading to subscriber locations would be required. Such re-cabling is costly and time-consuming.

For these and other reasons, improvements are desirable.

SUMMARY

The above and other problems are solved in accordance with the present disclosure by the following:

In a first aspect, a system for delivering multiple passive optical network services is disclosed. The system includes a first optical transmission service comprising a common wavelength pair routed from a source to each of a plurality of subscribers. The system further includes a second optical transmission service comprising a plurality of unique wavelength pairs, where each of the unique wavelength pairs is routed from the source to a subscriber among the plurality of subscribers. The system delivers the first optical transmission service and the second optical transmission service to the subscriber on a single optical fiber.

In a second aspect, a method for delivering multiple passive optical network services is disclosed. The method includes splitting a first optical transmission service from source to a plurality of subscribers, the first optical transmission service including a common wavelength pair. The method further includes separating a second optical transmission service including a plurality of unique wavelength pairs onto a corresponding plurality of optical fibers, where each optical fiber receives a unique wavelength pair associated with a subscriber among the plurality of subscribers. The method also includes routing the first and second wavelengths of the first optical transmission service and the first and second wavelengths of the second optical transmission service to the subscriber on a single optical fiber.

DETAILED DESCRIPTION

Figure 1:
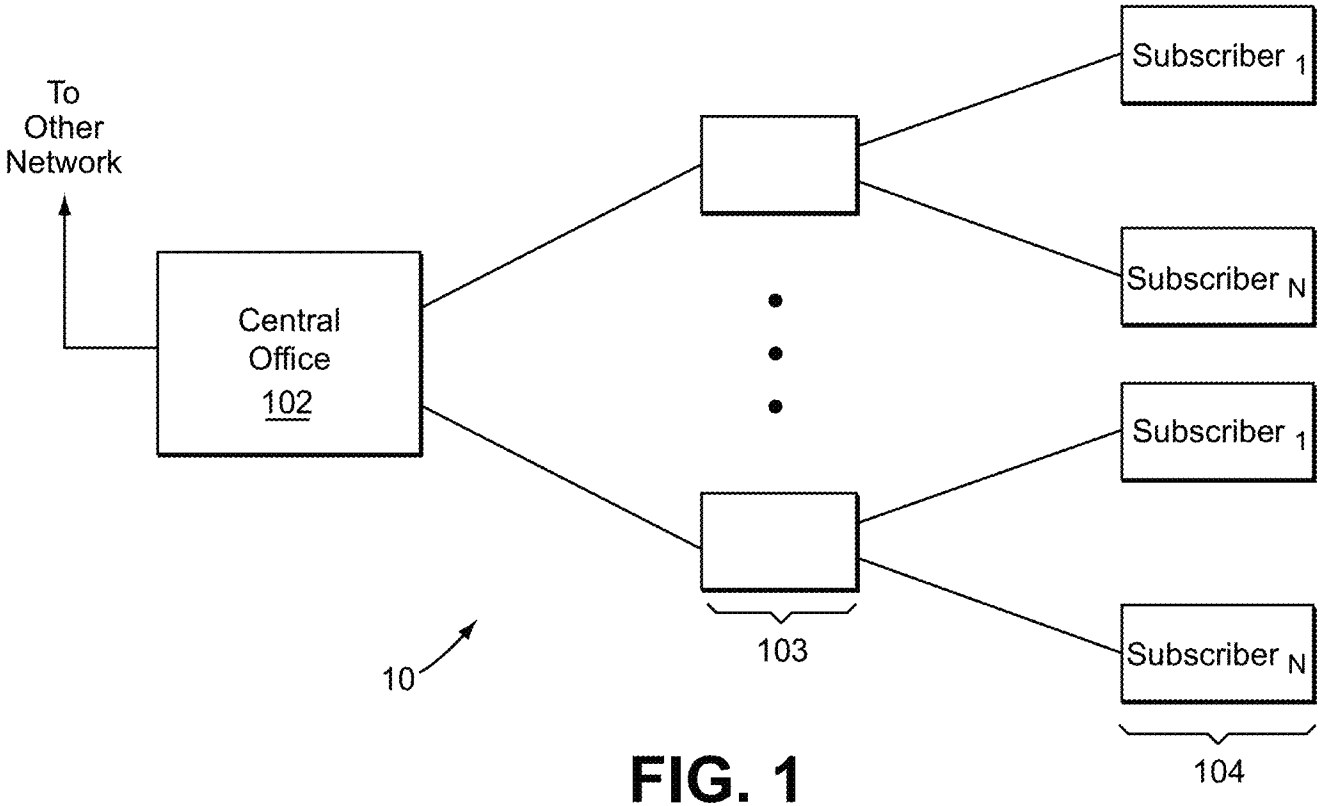
FIG. 1 illustrates a typical network in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to delivery of multiple passive optical network services to a single endpoint, such as a household, a business, or other entity requiring a telecommunications connection to a distribution hub. The present disclosure describes a variety of passive optical network configurations which allow for selective use of one or more of the passive optical network services, thereby allowing selective upgrading of endpoints based on customer desires or requirements. The methods and systems of the present disclosure allow use of the same optical fibers already deployed to customer homes.

The present disclosure is designed to enable providers of data/video/voice services who have currently deployed fiber-to-the-premise (FTTP) distribution networks for those services, be able to upgrade customers to higher data rate & bandwidth service(s) while maintaining the other services in their current delivery format. For example, a service provider may upgrade its data service to deliver individual customers with a 1 Gbps data line via a DWDM passive optical network (DWDM PON) while continuing to deliver voice and video to that same customer on its traditional gigabit PON (GPON). However, both would be delivered to the customer premise on the same already installed fiber. In this example, the service provider would not have to upgrade all of its delivery equipment to work with the new DWDM PON system but can use the fiber network that is already deployed in the field to deliver all of these services.

In various examples of the present disclosure, delivery of gigabit passive optical networks and DWDM passive optical networks are considered; however, deployment of additional types of optical networks is possible as well using the systems and techniques disclosed herein. For example the present disclosure also relates to delivery of other types of systems with different wavelengths and parallelism, such as WDM-PON and CWDM-PON.

Referring now to FIG. 1, a generalized network in which aspects of the methods and systems of the present disclosure may be implemented. The network 10 as shown is a passive optical network (PON) such as can contain various Fiber-to-the-premises (FTTP) systems. The network 10 connects a source 102, such as a central office of a telecommunications provider, to various subscribers 104, allowing the subscribers high speed data communications to other subscribers within the network and outside of the network (through other communication channels of the source). The network 10 includes a number of fiber optic components 103 that allow the network to route specific fiber optic signals to a subset of the entire subscriber base, thereby allowing the central office 102 to manage bandwidth concerns. The components can include, for example, splices, splitters, wavelength division multiplexers, repeaters, filters, and other optical components. These components may be modularly added or removed from the fiber optic system, such as by placing various combinations of such equipment in a fiber distribution hub or other modularly extensible system. The systems of the present disclosure breakout multifiber cable down to single fiber, limited wavelength spectra to allow a small number of users to share a particular available bandwidth. For example, in the case of gigabit PON, 32 subscribers 104 typically share a single wavelength for transmitting and receiving data with the source 102. In the case of DWDM PON, each subscriber has a dedicated wavelength pair which it uses to communicate with the source 102, thereby effectively increasing the bandwidth to that subscriber as compared to gigabit PON by eliminating competing traffic using that subscriber's communication wavelength.

Figure 2:
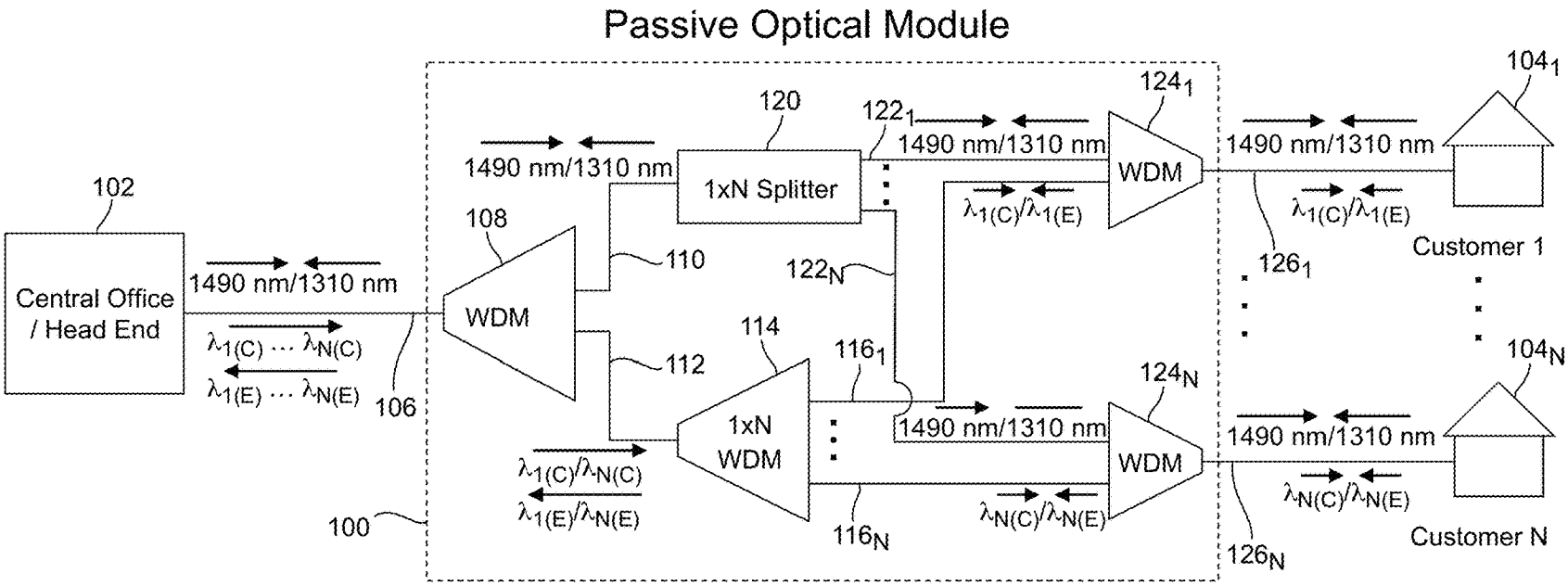
FIG. 2 shows a schematic view of a system for delivery of multiple passive optical network services, according to one embodiment of the present disclosure.
Figure 3:
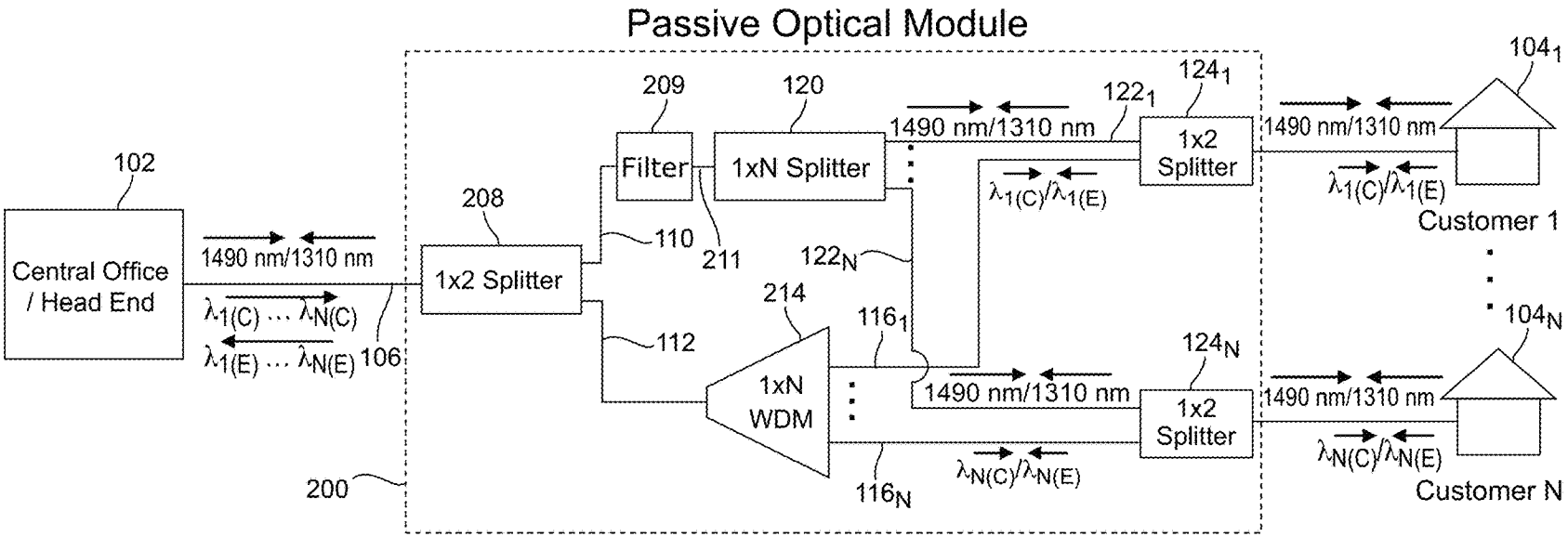
FIG. 3 shows a schematic view of a system for delivery of multiple passive optical network services, according to a second embodiment of the present disclosure.
Figure 4:
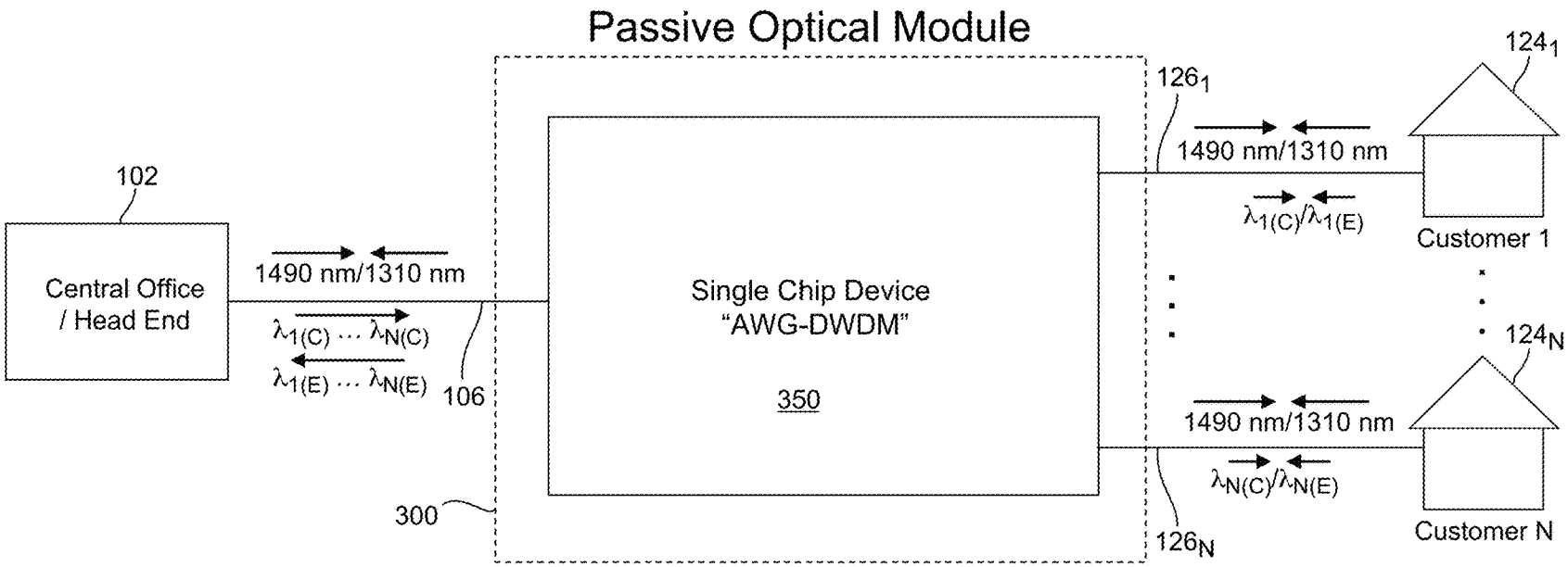
FIG. 4 shows a schematic view of a system for delivery of multiple passive optical network services, according to a third embodiment of the present disclosure.

Referring now to FIGS. 2-4, various systems for delivery of multiple passive optical network services are shown. These systems can be located within the network 10 of FIG. 1, and provide at least a portion of the connecting optical components used to connect a source 102 to subscribers 104.

Referring now to FIG. 2, a schematic view of a system 100 for delivery of multiple passive optical network services is shown, according to one embodiment of the present disclosure. The system 100 connects optical fibers from a source 102, shown as a central office or OLT, to one or more subscribers 104, shown as customers or ONT connections. The system receives an initial distribution fiber 106 leading from the source 102, on which all spectra of optical transmission coexist.

In the embodiment shown, the spectra of optical transmission include (1) a common wavelength pair and (2) a plurality of unique wavelength pairs. According to certain implementations the common wavelength pair is a 1310 nm wavelength and a 1490 nm wavelength used in gigabit passive optical network systems. In such systems, the 1490 nm wavelength is used to transmit data from the source 102 to all of the subscribers 104, while the 1310 nm wavelength is used by all of the subscribers to transmit data back to the source. Other common wavelengths may be used as well with different types of optical services.

The unique wavelength pairs include a predetermined number of wavelength pairs, each of which connects to a single subscriber. By dedicating a wavelength pair to each subscriber, that subscriber will not need to share the bandwidth available for that wavelength pair with other subscribers on a passive optical network, thereby allowing for higher data rates due to parallel transmission of the different unique wavelength pairs. Selection of the various unique wavelength pairs is largely a matter of design choice; however, in a possible embodiment, the wavelength pairs are the corresponding C-Band and E-Band frequencies used in DWDM data transmission.

A wavelength division multiplexer 108 is connected to the fiber 106, and separates the common wavelength signals from the unique wavelength signals. In the embodiment shown, the common wavelength gigabit PON signals (1310 and 1490 nm signals) are split to a fiber 110, while the DWDM PON signals are split to fiber 112.

The unique wavelength signals (e.g. DWDM PON signals) on fiber 112 are passed through a 1×N wavelength division multiplexer 114, which separates the signals onto N different fibers. In the embodiment shown, there are N different DWDM PON signals on fiber 112, and each of these signals is broken out onto a separate fiber $\mathbf{116}_{1\text{-}N}$.

The gigabit PON signals on fiber 110 are passed to a splitter 120, which splits the signals into a corresponding number of optical fibers $\mathbf{122}_{1\text{-}N}$, each carrying the common wavelength pair signals. In the embodiment shown, the splitter 120 is a 1×N splitter, corresponding to the 1×N wavelength division multiplexer 114.

Each of optical fibers $\mathbf{116}_{1\text{-}N}$ and $\mathbf{122}_{1\text{-}N}$ are passed into separate wavelength division multiplexers $\mathbf{124}_{1\text{-}N}$, (of which only WDM $\mathbf{124}_1$ and $\mathbf{124}_N$ are shown, for simplicity) which combine the common wavelength pair signals on the optical fibers $\mathbf{122}_{1\text{-}N}$ with each individual (and now separated) unique wavelength pair signal on optical fibers $\mathbf{116}_{1\text{-}N}$ to form subscriber lines $\mathbf{126}_{1\text{-}N}$, which carry both the common wavelength pair signals and one of the sets of unique wavelength pair signals to a subscriber 104 (e.g. $\mathbf{104}_1$ and analogously to other subscribers $\mathbf{104}_{2\text{-}N}$).

Through use of the system 100, a subscriber 104 therefore receives the common wavelength signals and one of the pairs of unique wavelength signals, allowing two different passive optical network services (e.g. gigabit PON and DWDM PON) to be delivered to the subscriber without requiring rewiring or additional wiring to the subscriber's premises.

Referring now to FIG. 3, a schematic view of a system 200 for delivery of multiple passive optical network services is shown, according to a second embodiment of the present disclosure. The system 200 generally corresponds to system 100 of FIG. 2 in effect, but separates and recombines the common wavelength pair and unique wavelength pairs in a slightly different manner. Specifically, the optical fiber 106 leading from the source 102 connects to a 1×2 splitter 208, which splits, but does not filter, the common wavelength pairs and the unique wavelength pairs onto optical fibers 110 and 112. One path connects to a 1×N DWDM 214, which filters out the common wavelength signal and also splits the unique wavelength signals onto N corresponding fibers $\mathbf{116}_{1\text{-}N}$, as previously described. The second path includes a filter 209 connected to the fiber 110, which filters out the unique wavelength pairs, leaving only the common wavelength signal on a fiber 211 leading from the filter. The fiber 211 leads to a 1×N splitter 120 as previously described, which outputs the common wavelength signals onto fibers $\mathbf{122}_{1\text{-}N}$. The common wavelength signal, carried on each of fibers $\mathbf{122}_{1\text{-}N}$, is combined with each individual unique wavelength signal on the fibers $\mathbf{116}_{1\text{-}N}$ via 1×2 splitters $\mathbf{224}_{1\text{-}N}$. The splitters $\mathbf{224}_{1\text{-}N}$ are connected to output cables $\mathbf{126}_{1\text{-}N}$, which connect to subscribers $\mathbf{104}_{1\text{-}N}$.

Referring now to FIG. 4, a schematic view of a system 300 for delivery of multiple passive optical network services is shown, according to a third embodiment of the present disclosure. In this embodiment, the system 300 includes an AWG DWDM 350 connecting optical fiber 106 from the source 102 to the various subscribers $\mathbf{104}_{1\text{-}N}$. The AWG DWDM separates the unique wavelength signals, while allowing the common wavelength signals to pass to all of the output fibers $\mathbf{126}_{1\text{-}N}$ that lead to various customers $\mathbf{104}_{1\text{-}N}$.

Alternative designs exist in which multiple fibers are used leading from the source 104. For example, in the systems of FIGS. 2 and 3, above, separate fibers could be used leading from the source 104 carrying the unique wavelength pairs to the wavelength division multiplexer 114, 214 and the common wavelength pairs to the splitter 120 of FIGS. 2 and 3, respectively. This would eliminate the need for the wavelength division multiplexer 108 of FIG. 2 or the splitter 208 and filter 209 of FIG. 3. Other embodiments are possible as well which include different levels and combinations of splitters, filters, and wavelength division multiplexers.

In the embodiments shown in FIGS. 2-4, the systems for delivery of multiple passive optical network services are illustrated as passive optical modules. However, it is understood that the system can be configured from a number of separate components, and could include additional passive or active optical components. Furthermore, additional optical networking components can be incorporated into networks having the systems described herein.

Through use of the systems disclosed herein, a provider of passive optical network services can connect multiple services to a single subscriber location while avoiding the need to lay additional fibers to those locations. A provider or maintainer of an optical network such as are disclosed herein can install the splitters, filters, and wavelength division multiplexers as described herein to split a common wavelength pair into a number of fibers, and to separate unique wavelength pairs onto a corresponding number of fibers. The fibers carrying the common wavelength pair can be joined to each one of the fibers carrying different unique wavelength pairs to allow connection of a subscriber to either one or both services by using a single preexisting optical fiber connected to the subscriber.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system for delivering multiple passive optical network services comprising:

a first optical transmission service comprising a common wavelength pair routed from a source to each of a plurality of subscribers, the common wavelength pair operable using a downstream transmission wavelength of 1490 nm and an upstream transmission wavelength of 1310 nm;

a second optical transmission service comprising a plurality of unique wavelength pairs, each of the unique wavelength pairs routed from the source to a subscriber among the plurality of subscribers;

a wavelength division multiplexer configured to separate each of the unique wavelength pairs of the second optical transmission service onto separate optical fibers; and a splitter joining a fiber carrying the common wavelength pair with one of the fibers leading from the wavelength division multiplexer carrying one of the unique wavelength pairs to transmit the common wavelength pair and the unique wavelength pair to the subscriber on the single optical fiber;

wherein the first optical transmission service and the second optical transmission service are delivered to the subscriber on a single optical fiber.

2. The system of claim 1, wherein the first and second optical transmission services connect to the source on a single optical fiber.

3. The system of claim 1, wherein the source is a central office of a fiber optic communications service provider.

4. A system for delivering multiple passive optical network services comprising:

a first optical transmission service comprising a common wavelength pair routed from a source to each of a plurality of subscribers, the common wavelength pair operable using a downstream transmission wavelength of 1490 nm and an upstream transmission wavelength of 1310 nm;

a second optical transmission service comprising a plurality of unique wavelength pairs, each of the unique wavelength pairs routed from the source to a subscriber among the plurality of subscribers;

a wavelength division multiplexer configured to separate each of the unique wavelength pairs of the second optical transmission service onto separate optical fibers; and a second wavelength division multiplexer joining a fiber carrying the common wavelength pair with one of the fibers leading from the wavelength division multiplexer carrying one of the unique wavelength pairs to transmit the common wavelength pair and the unique wavelength pair to the subscriber on the single optical fiber;

wherein the first optical transmission service and the second optical transmission service are delivered to the subscriber on a single optical fiber.

5. The system of claim 1, further comprising a filter positioned between the source and the splitter, the filter separating the common wavelength pair from the plurality of unique wavelength pairs.

*6. A passive optical network services module optically connected between a central office and a plurality of subscriber locations, the passive optical network services module comprising:*

*a single fiber connection optically connected to a central office, the single fiber connection carrying a first optical transmission service and a second optical transmission service;*

*wherein:*

*the first optical transmission service includes a common wavelength pair routed from a source to each of a plurality of subscribers, the common wavelength pair operable using a downstream transmission wavelength and an upstream transmission wavelength that are not adjacent to each other; and*

*second optical transmission service comprising a plurality of unique wavelength pairs, each of the unique wavelength pairs routed from the source to a subscriber among the plurality of subscribers;*

*a first wavelength division multiplexer optically connected to the single fiber connection and having a first downstream optical connection and a second downstream optical connection, the first wavelength division multiplexer configured to separate the first optical transmission service from the second optical transmission service; the first optical transmission service optically routed to the first downstream optical connection and the second optical transmission service optically routed to the second downstream optical connection;*

*a second wavelength division multiplexer optically connected to the second downstream optical connection of the first wavelength division multiplexer; the second wavelength division multiplexer configured to separate each of the unique wavelength pairs of the second optical transmission service onto separate optical fibers;*

*wherein the first optical transmission service or the second optical transmission service are selectably provided to one or more of the subscriber locations.*

*7. The passive optical network services module of claim 6, further comprising a third wavelength division multiplexer optically connected downstream of the second wavelength division multiplexer and receiving at least one of the unique wavelength pairs.*

*8. The passive optical network services module of claim 7, wherein a downstream optical connection of the third wavelength division multiplexer is provided as an optical connection to a subscriber.*

* * * * *